US012630136B2

(12) United States Patent
Otake et al.

(10) Patent No.: US 12,630,136 B2
(45) Date of Patent: May 19, 2026

(54) ELECTRIC BRAKING DEVICE

(71) Applicant: ADVICS CO., LTD., Kariya (JP)

(72) Inventors: Tsuyoshi Otake, Kariya (JP); Atsushi Takahashi, Kariya (JP)

(73) Assignee: ADVICS CO., LTD., Kariya (JP)

( * ) Notice: Subject to any disclaimer, the term of this patent is extended or adjusted under 35 U.S.C. 154(b) by 257 days.

(21) Appl. No.: 18/702,659

(22) PCT Filed: Oct. 31, 2022

(86) PCT No.: PCT/JP2022/040813
§ 371 (c)(1),
(2) Date: Apr. 18, 2024

(87) PCT Pub. No.: WO2023/074906
PCT Pub. Date: May 4, 2023

(65) Prior Publication Data
US 2024/0416885 A1     Dec. 19, 2024

(30) Foreign Application Priority Data

Nov. 1, 2021     (JP) .................................. 2021-178952

(51) Int. Cl.
*B60T 13/74*          (2006.01)
*B60T 13/66*          (2006.01)
*B60T 17/22*          (2006.01)

(52) U.S. Cl.
CPC .......... *B60T 13/741* (2013.01); *B60T 13/662* (2013.01); *B60T 17/22* (2013.01)

(58) Field of Classification Search
CPC ...... B60T 13/741; B60T 13/662; B60T 17/22; B60T 13/74; B60T 8/42; B60T 13/148; B60T 13/745
See application file for complete search history.

(56) References Cited

U.S. PATENT DOCUMENTS

2009/0217659 A1*   9/2009   Ohno .................... B60T 13/746
                                                              60/545
2013/0192222 A1*   8/2013   Nomura ................ B60T 8/4077
                                                              60/545
(Continued)

FOREIGN PATENT DOCUMENTS

JP        2014-525875  A     10/2014
JP        2015-113033  A      6/2015
JP          2017178098  A  * 10/2017   .............. B60T 13/66

OTHER PUBLICATIONS

International Search Report Issued Jan. 10, 2023, in PCT/JP2022/040813, filed on Oct. 31, 2022, 4 pages, with English Translation.

*Primary Examiner* — Xiao En Mo

(74) *Attorney, Agent, or Firm* — Oblon, McClelland, Maier & Neustadt, L.L.P.

(57) ABSTRACT

An electric braking device includes an electric cylinder unit. The electric cylinder unit includes electric cylinder devices, a housing, and a circuit board accommodated in a board case. The electric cylinder devices are supported by the housing so as to be removable from the housing by being moved relative to the housing in a first X-axis direction. Electric motors of the electric cylinder devices are provided with male connectors, and the board case is provided with female connectors. Fitting between the male connector and the female connector is released by moving the male connector relative to the female connector in the first X-axis direction.

15 Claims, 6 Drawing Sheets

(56)    References Cited

U.S. PATENT DOCUMENTS

| | | |
|---|---|---|
| 2014/0216866 A1 | 8/2014 | Feigel et al. |
| 2014/0283513 A1* | 9/2014 | Watanabe ............... B60T 13/66 |
| | | 60/545 |
| 2017/0282880 A1 | 10/2017 | Nakamura |

* cited by examiner

30

41

300

40

54

67

60

61

50B

67

60

61

50A

54

51

33

51

31

Z1

Z

Y1

X2

X1

Y2

X

Y

Z2

ELECTRIC BRAKING DEVICE

TECHNICAL FIELD

The present disclosure relates to an electric braking device that generates a braking force on a wheel by supplying a brake fluid to a wheel cylinder.

BACKGROUND ART

An electric braking device disclosed in PTL 1 includes an electric cylinder device that adjusts a braking force of a vehicle by supplying a brake fluid to and discharging the brake fluid from a plurality of wheel cylinders, and a circuit board that controls an electric motor that is a power source of the electric cylinder device.

CITATION LIST

Patent Literature

PTL 1: JP2015-113033A

BRIEF SUMMARY

Technical Problem

When replacing the electric cylinder device, it is necessary not only to remove the electric cylinder device from a housing but also to release electrical connection between the electric motor and the circuit board.

Solution to Problem

In order to solve the above problems, there is provided an electric braking device including an electric cylinder unit including an electric cylinder device that converts rotational motion of an electric motor into linear motion for driving a piston in a cylinder, a housing that supports the electric cylinder device, a circuit board that controls the electric motor, a power transmission terminal that is electrically connected to the circuit board, a power reception terminal that is electrically connected to the electric motor, and a connector that connects the power transmission terminal to the power reception terminal, the electric cylinder unit being configured to adjust a braking force applied to a vehicle by an operation of the electric cylinder device. In this electric braking device, the electric cylinder device is supported by the housing so as to be removable from the housing by being moved relative to the housing in a removal direction when disassembling the electric cylinder unit. The connector is disposed in a posture in which a fitting direction of the connector is directed to the removal direction.

According to the above configuration, when removing the electric cylinder device from the housing by moving the electric cylinder device relative to the housing in the removal direction, connection between the power reception terminal and the power transmission terminal can be released in the connector. That is, electrical connection between the electric motor and the circuit board can also be released by removing the electric cylinder device from the housing. Therefore, the electric cylinder device can be easily replaced.

DESCRIPTION OF EMBODIMENTS

Hereinafter, an embodiment in which an electric braking device is implemented as an electric braking device provided in a vehicle will be described with reference to FIGS. 1 to 7.

Figure 1:
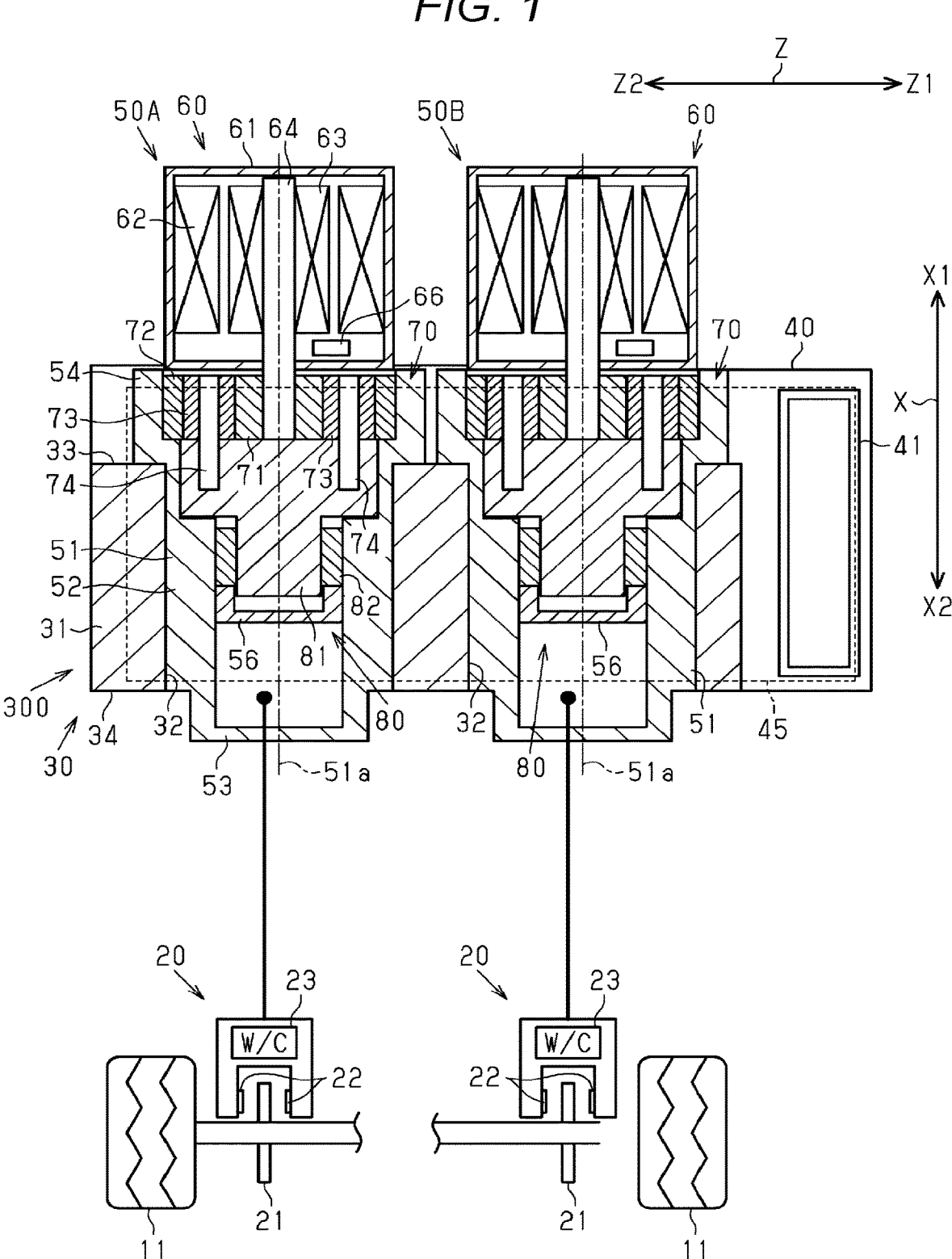
FIG. 1 is a view showing a cross section of an electric braking device according to an embodiment and a schematic configuration of a friction brake provided for a wheel.

FIG. 1 shows an electric braking device 30, a plurality of wheels 11, and a plurality of friction brakes 20 according to the present embodiment. One friction brake 20 is provided for one wheel 11.

<Friction Brake 20>

The friction brake 20 includes a friction target portion 21 that rotates integrally with the wheel 11, a friction portion 22, and a wheel cylinder 23. When a brake fluid is supplied to the wheel cylinder 23 and a hydraulic pressure in the wheel cylinder 23 increases, the friction portion 22 is pressed against the friction target portion 21. Accordingly, a braking force is generated in the wheel 11.

<Electric Braking Device 30>

Figure 2:
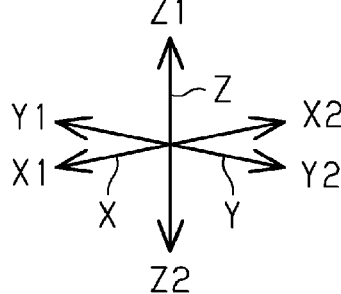
FIG. 2 is a perspective view of the electric braking device.

FIG. 2 is a perspective view showing the electric braking device 30. FIG. 2 shows a first axis X, a second axis Y, and a third axis Z that are orthogonal to one another. One of two directions along the first axis X is referred to as a first X-axis direction X1, and the other is referred to as a second X-axis direction X2. One of two directions along the second axis Y is referred to as a first Y-axis direction Y1, and the other is referred to as a second Y-axis direction Y2. One of two directions along the third axis Z is referred to as a first Z-axis direction Z1, and the other is referred to as a second Z-axis direction Z2. In the present embodiment, a "direction along an axis" may be substantially the same as a direction in which the axis extends, and includes a direction that is slightly deviated due to a manufacturing error or an assembly error.

As shown in FIGS. 1 and 2, the electric braking device 30 includes an electric cylinder unit 300. The electric cylinder unit 300 includes a housing 31, a plurality of electric cylinder devices, a board case 40, and a circuit board 45. The electric cylinder unit 300 adjusts a braking force applied to the vehicle by an operation of electric cylinder devices 50A and 50B. Two electric cylinder devices 50A and 50B are provided in the present embodiment.

<Housing 31>

Figure 3:
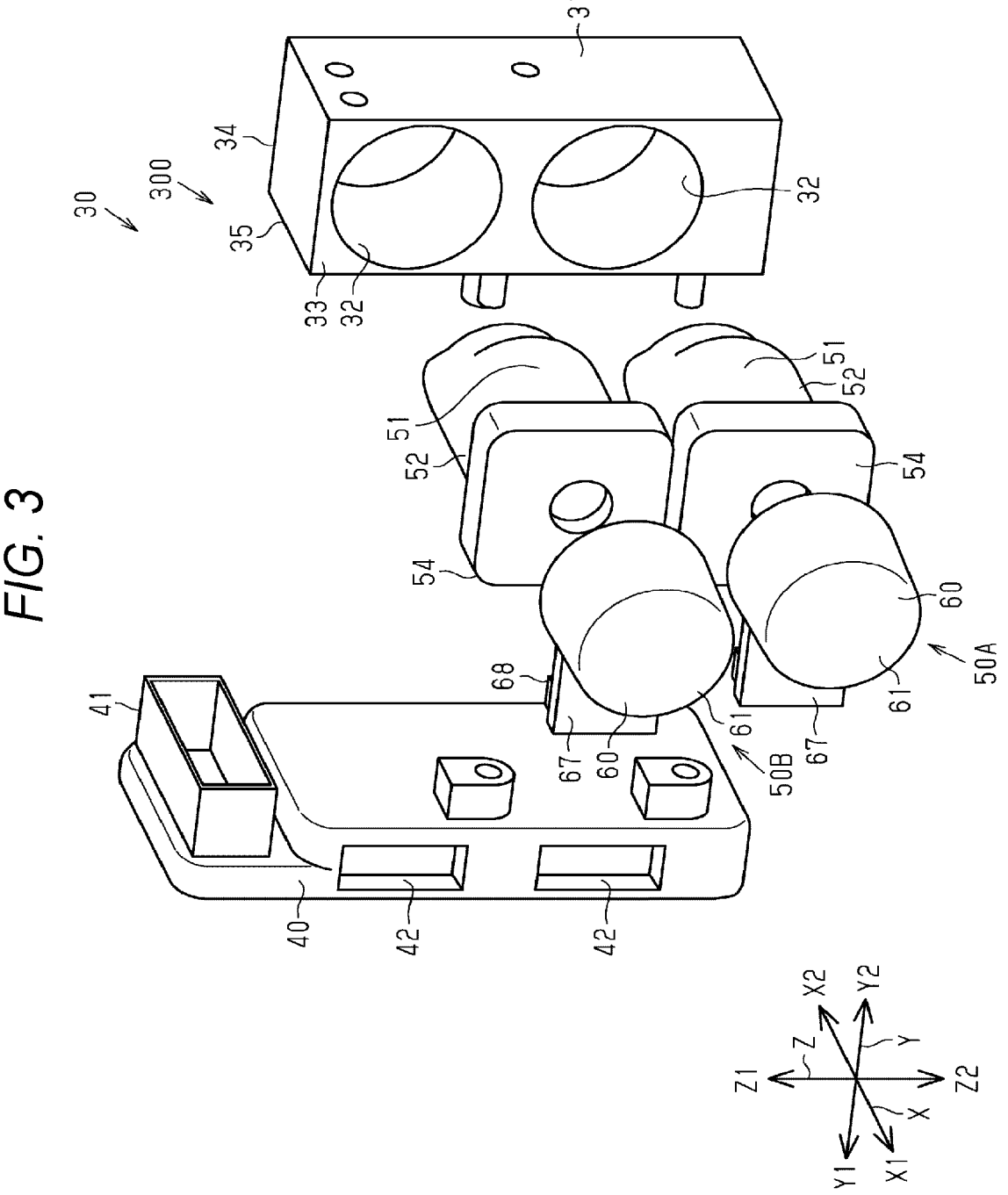
FIG. 3 is an exploded perspective view of the electric braking device.

As shown in FIGS. 1 and 3, the housing 31 supports the two electric cylinder devices 50A and 50B. Insertion holes 32 are formed in the housing 31 to penetrate the housing 31 in a direction along the first axis X. The same number of insertion holes 32 as that of the electric cylinder devices 50A and 50B are formed in the housing 31. The two insertion holes 32 are arranged in a direction along the third axis Z. The housing 31 supports the two electric cylinder devices 50A and 50B in such a manner that parts of the electric cylinder devices 50A and 50B are accommodated in the insertion holes 32.

The housing 31 also supports other element components for satisfying a brake system. Examples of other element components include components connected to the circuit board 45, such as a solenoid actuator and a pressure sensor. Further, the housing 31 also has a function as a fluid path connecting the components. For example, the housing 31 is provided with an oil port for connecting a pipe to the wheel cylinder 23 and a fluid path for connecting the electric cylinder devices 50A and 50B to the solenoid actuator, the pressure sensor, and the like.

The housing 31 includes two side surfaces 33 and 34 having openings formed by forming the insertion holes 32 in the housing 31. Among the two side surfaces 33 and 34, a side surface located in the first X-axis direction X1 is referred to as a support side surface 33, and a side surface located in the second X-axis direction X2 is referred to as a protruding side surface 34. The support side surface 33 and the protruding side surface 34 are, for example, flat surfaces orthogonal to the first axis X. Among side surfaces of the housing 31, a side surface connecting an end of the support side surface 33 in the first Y-axis direction Y1 and an end of the protruding side surface 34 in the first Y-axis direction Y1 is referred to as a board facing side surface 35. The solenoid actuator and the pressure sensor are disposed on the board facing side surface 35 and electrically connected to the circuit board 45 provided in the board case 40.

<<Electric Cylinder Devices 50A and 50B>>

As shown in FIG. 1, each of the electric cylinder devices 50A and 50B includes an electric motor 60 as a power source, a rotation transmission mechanism 70, a linear motion conversion mechanism 80, a cylinder 51, and a piston 56. Each of the electric cylinder devices 50A and 50B supplies a brake fluid to and discharge the brake fluid from the wheel cylinder 23 by linear motion of the piston 56 in the cylinder 51 in response to driving of the electric motor 60. That is, the electric cylinder devices 50A and 50B convert rotational motion of the electric motor 60 into the linear motion for driving the piston 56 in the cylinder 51.

Figure 4:
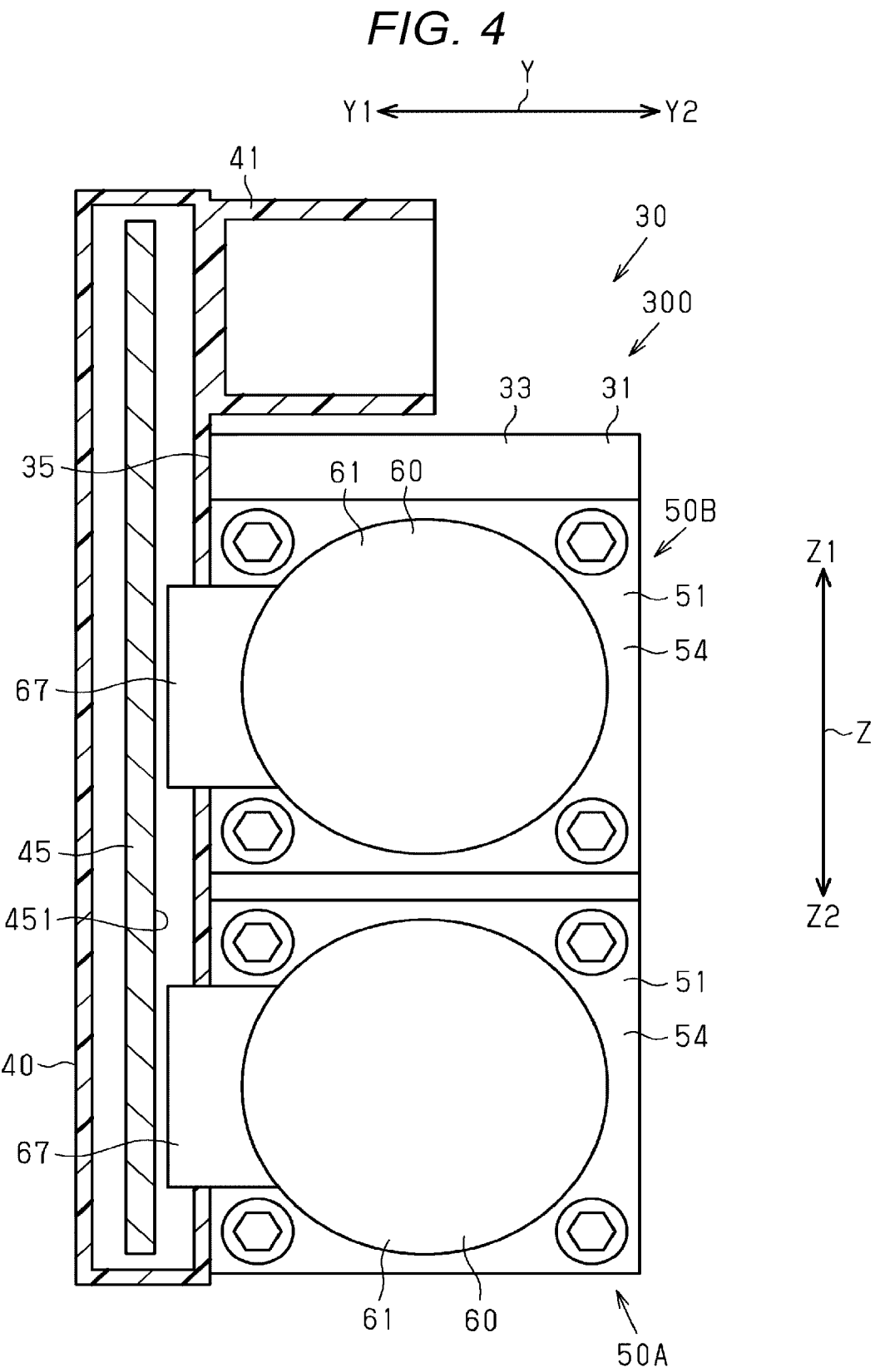
FIG. 4 is a partially cutaway plan view of the electric braking device.

The cylinder 51 includes a cylindrical main body portion 52, a bottom wall 53 that closes an end of the main body portion 52 in the second X-axis direction X2, and a flange 54 connected to an end of the main body portion 52 in the first X-axis direction X1. The flange 54 is in surface-contact with the support side surface 33 of the housing 31. For example, the flange 54 is bolted to the housing 31 as shown in FIG. 4.

As shown in FIGS. 1 and 2, the main body portion 52 is inserted into the insertion hole 32. A tip end portion of the main body portion 52, which is an end portion in the second X-axis direction X2, protrudes from the housing 31 in the second X-axis direction X2.

Since the two insertion holes 32 are arranged in the direction along the third axis Z as described above, the two electric cylinder devices 50A and 50B are arranged in the direction along the third axis Z. Among the two electric cylinder devices 50A and 50B, one electric cylinder device (for example, the electric cylinder device 50A) is referred to as a "first electric cylinder device", and the remaining electric cylinder device (for example, the electric cylinder device 50B) is referred to as a "second electric cylinder device". At this time, the direction along the third axis Z is an example of a radial direction of the cylinder 51 of the electric cylinder device 50A as the first electric cylinder device. That is, the direction along the third axis Z corresponds to an "alignment direction" of the plurality of electric cylinder devices 50A and 50B. Therefore, in the present embodiment, the two electric cylinder devices 50A and 50B are supported by the housing 31 in a manner of being arranged in the alignment direction.

In the electric cylinder device 50A as the first electric cylinder device, an axis 51a of the cylinder 51 extends in the direction along the first axis X. Similarly, in the electric cylinder device 50B as the second electric cylinder device, the axis 51a of the cylinder 51 extends in the direction along the first axis X. That is, the plurality of electric cylinder devices 50A and 50B are disposed with the axes 51a of the cylinders 51 parallel to each other.

Here, the axis 51a of the cylinder 51 is also an axis of the piston 56. The radial direction of the cylinder 51 is also a radial direction of the piston 56. Therefore, in the present embodiment, it can be said that the plurality of electric cylinder devices 50A and 50B are disposed adjacent to each other in the alignment direction, which is the radial direction of the pistons 56, with the axes of the pistons 56 parallel to each other.

When disassembling the electric cylinder unit 300, the cylinder 51 can be removed from the housing 31 by releasing fixation between the flange 54 and the housing 31. That is, the two electric cylinder devices 50A and 50B are supported by the housing 31 in a manner of being removable from the housing 31 by moving the cylinders 51 relative to the housing 31 in the first X-axis direction X1. That is, in the present embodiment, the first X-axis direction X1 corresponds to a "removal direction" in which the electric cylinder devices 50A and 50B are moved relative to the housing 31 when removing the electric cylinder devices 50A and 50B from the housing 31.

The piston 56 moves forward and backward in the cylinder 51 in the direction in which the axis 51a of the cylinder 51 extends. That is, the piston 56 is movable in the first X-axis direction X1 and the second X-axis direction X2. When the piston 56 moves in the second X-axis direction X2, the brake fluid is supplied from the cylinder 51 toward the wheel cylinder 23. On the other hand, when the piston 56 moves in the first X-axis direction X1, the brake fluid is discharged from the wheel cylinder 23 toward the cylinder 51.

The electric motor 60 includes a motor housing 61, a stator 62, a rotor 63, and an output shaft 64 that rotates integrally with the rotor 63. The motor housing 61 is disposed in the first X-axis direction X1 with respect to the housing 31. Specifically, the motor housing 61 is fixed to the cylinder 51 in a manner of being placed on the flange 54. The stator 62 and the rotor 63 are accommodated in the motor housing 61. The output shaft 64 protrudes outside the motor housing 61. The output shaft 64 extends in the direction along the first axis X. Therefore, an axis of the electric motor 60 extends in a direction along the axis 51a of the cylinder 51. Specifically, the electric motor 60 is disposed coaxially with the cylinder 51. In the present embodiment, the output shaft 64 protrudes from the motor housing 61 in the second X-axis direction X2.

In the present embodiment, the electric motor 60 is fixed to the cylinder 51 in a state in which the motor housing 61 is attached to the flange 54. Therefore, the electric motor 60 can be removed from the cylinder 51 by releasing attachment between the motor housing 61 and the flange 54. Since the output shaft 64 extends in the direction along the first axis X, the electric motor 60 can be removed from the cylinder 51 by moving the electric motor 60 in the first X-axis direction X1, which is also the removal direction.

That is, the two electric cylinder devices 50A and 50B are configured such that the electric motor 60 is removable from the cylinder 51 by moving the electric motor 60 relative to the cylinder 51 in the first X-axis direction X1.

A motor angle sensor 66 that detects a rotation angle of the rotor 63 is provided in the motor housing 61. For example, the motor angle sensor 66 is a resolver. The motor angle sensor 66 outputs, to the circuit board 45, a detection signal that is a signal corresponding to rotation of the rotor 63.

As shown in FIGS. 3 and 4, in the present embodiment, the electric motor 60 includes an extension portion 67 extending radially outward from the motor housing 61. Specifically, the extension portion 67 extends from the motor housing 61 in the first Y-axis direction Y1. The extension portion 67 is provided with a male connector 68 protruding in the second X-axis direction X2, that is, toward the board case 40.

Figure 5:
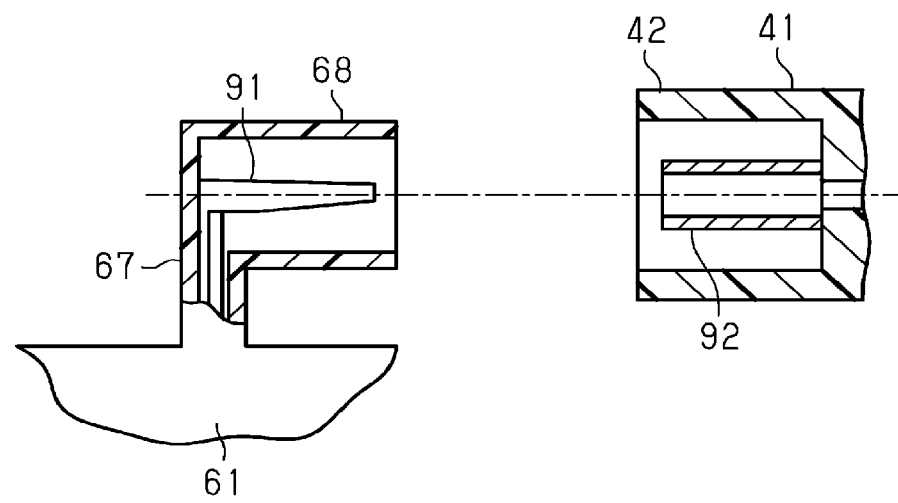
FIG. 5 is a cross-sectional view schematically showing a male connector of an electric motor and a female connector provided on a board case.
Figure 5:
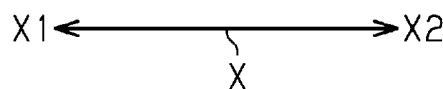
Figure 6:
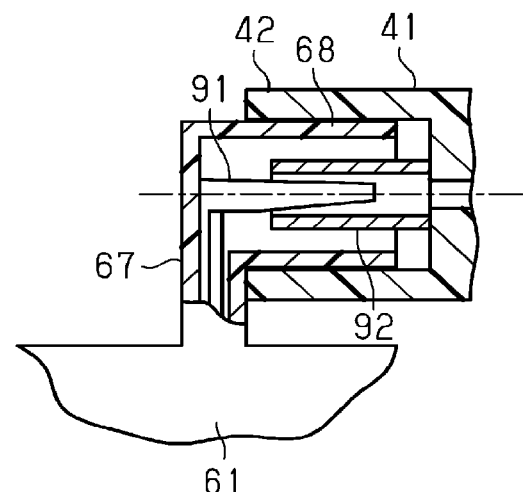
FIG. 6 is a cross-sectional view showing a state in which the male connector is fitted into the female connector.

As shown in FIGS. 5 and 6, the male connector 68 is provided with a power reception terminal 91 electrically connected to the electric motor 60. That is, the power reception terminal 91 is connected to a coil of the electric motor 60. The male connector 68 is provided with a sensor terminal that is a terminal electrically connected to a signal line of the motor angle sensor 66.

The rotation transmission mechanism 70 transmits the rotational motion of the electric motor 60 to the linear motion conversion mechanism 80. Specifically, the rotation transmission mechanism 70 is a deceleration mechanism that decelerates the rotational motion of the electric motor 60 and transmits the decelerated rotational motion to the linear motion conversion mechanism 80. For example, the rotation transmission mechanism 70 includes a sun gear 71, a ring gear 72, and a plurality of pinion gears 73 as shown in FIG. 1. The plurality of pinion gears 73 mesh with both the sun gear 71 and the ring gear 72, and can rotate and revolve. Since the output shaft 64 of the electric motor 60 is coupled to the sun gear 71, the sun gear 71 rotates integrally with the output shaft 64. The plurality of pinion gears 73 are connected to the linear motion conversion mechanism 80 via output pins 74.

The linear motion conversion mechanism 80 converts the rotational motion transmitted from the rotation transmission mechanism 70 into linear motion and outputs the linear motion to the piston 56. The linear motion conversion mechanism 80 is, for example, a ball screw mechanism or a feed screw mechanism. The linear motion conversion mechanism 80 includes a rotation portion 81 connected to the plurality of output pins 74, and a linear motion portion 82. When the rotational motion is transmitted from the plurality of output pins 74 to the rotation portion 81, the rotation portion 81 rotates, and the linear motion portion 82 linearly moves in a direction corresponding to a rotation direction of the rotation portion 81. When the linear motion portion 82 moves in the second X-axis direction X2, the piston 56 is pushed by the linear motion portion 82 and moves in the second X-axis direction X2. On the other hand, when the linear motion portion 82 moves in the first X-axis direction X1, the linear motion portion 82 pulls the piston 56 in the first X-axis direction X1, and the piston 56 moves in the first X-axis direction X1 with assistance of a hydraulic pressure in the cylinder 51. In the present embodiment, a screw is adopted as the rotation portion 81, and a nut disposed radially outward of the screw is adopted as the linear motion portion 82.

<<Board Case 40 and Circuit Board 45>>

As shown in FIGS. 1 and 2, the board case 40 has a substantially rectangular parallelepiped shape and accommodates the circuit board 45 therein. The board case 40 is fixed to the housing 31. The direction along the first axis X is also the direction in which the axes 51a of the cylinders 51 of the electric cylinder devices 50A and 50B extend, and the direction along the third axis Z is the alignment direction. Therefore, it can be said that the board case 40 is adjacent to the housing 31 in a direction along the second axis Y orthogonal to both the first axis X and the third axis Z. In other words, the board case 40 is fixed to the housing 31 in a posture facing the board facing side surface 35 as shown in FIGS. 3 and 4. At this time, a dimension of the board case 40 in the direction along the third axis Z is larger than both a dimension of the board case 40 in the direction along the first axis X and a dimension of the board case 40 in the direction along the second axis Y. The dimension of the board case 40 in the direction along the first axis X is larger than the dimension of the board case 40 in the direction along the second axis Y.

A dimension of the board case 40 in the first Z-axis direction Z1 is larger than a dimension of the housing 31 in the first Z-axis direction Z1. A power connector 41 is disposed at an end portion of the board case 40 in the first Z-axis direction Z1. The power connector 41 protrudes from the board case 40 in the second Y-axis direction Y2, and is located in the first Z-axis direction Z1 with respect to the housing 31. Electric power is supplied to the circuit board 45 from an in-vehicle power supply via the power connector 41.

A female connector 42 is provided in a side surface of the board case 40 at a position facing the extension portion 67 of the electric motor 60. In the present embodiment, since two electric motors 60 are provided, two female connectors 42 are arranged in the direction along the third axis Z. The corresponding male connector 68 is fitted into the female connector 42. That is, when the male connector 68 moves in the second X-axis direction X2 (fitting direction), the male connector 68 is fitted into the female connector 42. On the other hand, when the male connector 68 moves in the first X-axis direction X1 in a state in which the male connector 68 is fitted into the female connector 42, fitting between the male connector 68 and the female connector 42 is released.

As shown in FIGS. 5 and 6, the female connector 42 is provided with a power transmission terminal 92 electrically connected to the circuit board 45. When the male connector 68 is fitted into the female connector 42, the power reception terminal 91 is connected to the power transmission terminal 92. Accordingly, the electric power can be supplied from the circuit board 45 to the electric motor 60. On the other hand, when the male connector 68 moves relative to the female connector 42 in the first X-axis direction X1 and the fitting between the male connector 68 and the female connector 42 is released, connection between the power transmission terminal 92 and the power reception terminal 91 is released. That is, the connection between the power transmission terminal 92 and the power reception terminal 91 can be released by moving the male connector 68 relative to the female connector 42 in the first X-axis direction X1 that is the removal direction. Therefore, in the present embodiment, the male connector 68 and the female connector 42 constitute an example of a "connector" that connects the power transmission terminal 92 to the power reception terminal 91.

A control unit that controls the plurality of electric motors 60 is mounted on the circuit board 45. As shown in FIG. 1, the circuit board 45 has a rectangular plate shape. That is, a peripheral edge of the circuit board 45 includes two first edge portions extending in the direction along the third axis Z and two second edge portions extending in the direction along the first axis X. The two first edge portions are parallel to each other, and the two second edge portions are parallel to each other. A length of at least one of the two first edge portions is larger than a length of either of the two second edge portions. Therefore, the circuit board 45 is disposed in a posture in which a longitudinal direction of a plate surface thereof extends in the direction along the third axis z, and a lateral direction of the plate surface extends in the direction along the first axis X.

As described above, the axes 51*a* of the two cylinders 51 extend in the direction along the first axis X. A plate surface 451 of the circuit board 45 is parallel to both the first axis X and the third axis Z and is orthogonal to the second axis Y. That is, the circuit board 45 is disposed in a posture in which the plate surface 451 is parallel to the axis 51*a* of the cylinder 51.

Operational Effects of Present Embodiment (1) In the present embodiment, the electric cylinder devices 50A and 50B can be moved relative to the housing 31 in the first X-axis direction X1 (removal direction). When removing the electric cylinder devices 50A and 50B from the housing 31, the power reception terminal 91 moves relative to the power transmission terminal 92 in the first X-axis direction X1, and thus connection between the power reception terminal 91 and the power transmission terminal 92 can be released. That is, electrical connection between the electric motor 60 and the circuit board 45 can also be released by removing the electric cylinder devices 50A and 50B from the housing 31.

On the other hand, when attaching the electric cylinder devices 50A and 50B to the housing 31, the electric cylinder devices 50A and 50B are moved relative to the housing 31 in the second X-axis direction X2 opposite to the first X-axis direction X1. When attaching the electric cylinder devices 50A and 50B to the housing 31 in this manner, the power reception terminal 91 is connected to the power transmission terminal 92 in the connector. That is, the electric motor 60 and the circuit board 45 can be electrically connected to each other when the electric cylinder devices 50A and 50B are attached to the housing 31.

Therefore, the electric cylinder devices 50A and 50B can be easily replaced.

(2) In the electric cylinder devices 50A and 50B, the electric motor 60 can be removed from the cylinder 51 by moving the electric motor 60 relative to the cylinder 51 in the first X-axis direction X1 (removal direction). That is, replacement can be easily performed not only when replacing the entire electric cylinder devices 50A and 50B but also when replacing only the electric motor 60.

(3) The male connector 68 is provided on the extension portion 67 extending radially outward from the motor housing 61, and the female connector 42 is provided at a position facing the extension portion 67 in the board case 40. That is, the power reception terminal 91 and the power transmission terminal 92 can be connected and the connection can be released at a position that can be visually recognized by an operator. Therefore, when replacing the electric cylinder devices 50A and 50B, the operator can easily check whether the power reception terminal 91 is connected to the power transmission terminal 92.

(4) In the present embodiment, a detection signal from the motor angle sensor 66 is input to the circuit board 45 via the male connector 68 and the female connector 42. Therefore, electrical connection between the motor angle sensor 66 and the circuit board 45 can be released by releasing fitting between the male connector 68 and the female connector 42. On the other hand, the motor angle sensor 66 and the circuit board 45 can be electrically connected to each other by fitting the male connector 68 into the female connector 42.

Figure 7:
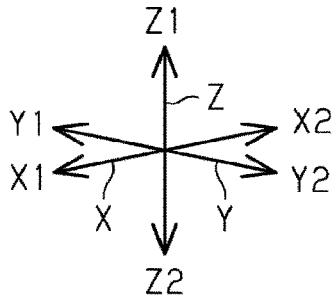
FIG. 7 is a perspective view showing an electric braking device in a state in which an electric cylinder device including a large-capacity cylinder is attached to a housing.

(5) No other member is provided in the second X-axis direction X2 with respect to the housing 31. Therefore, for example, an electric cylinder device including a cylinder 51A having a long dimension in a direction along the first axis X can be attached to the housing 31 as each of the electric cylinder devices 50A and 50B as shown in FIG. 7.

Modifications

The above embodiment can be modified as follows. The above embodiment and the following modifications can be implemented in combination with each other within a technically consistent range.

The electric motor 60 may not include the motor angle sensor 66.

In the electric cylinder device, the electric motor 60 may not be disposed coaxially with the cylinder 51 as long as an axis of the electric motor 60 extends in a direction along the axis 51*a* of the cylinder 51.

The electric cylinder device may not have a configuration described in the above embodiment, as long as the electric cylinder device can be removed from the housing 31 by being moved relative to the housing 31 in the first X-axis direction X1. For example, the electric cylinder device may be configured such that the axis 51*a* of the cylinder 51 intersects an axis of the electric motor 60.

The electric cylinder device may be configured such that the electric motor 60 cannot be removed from the cylinder 51.

The electric braking device 30 may include three or more electric cylinder devices arranged in a predetermined alignment direction.

The number of electric cylinder devices provided in the electric braking device 30 may be one. In this case, a brake fluid may be supplied from the electric cylinder device to the plurality of wheel cylinders 23.

The circuit board 45 may be disposed in a posture in which the plate surface 451 of the circuit board 45 is not parallel to the axis 51*a* of the cylinder 51.

A shape of the circuit board 45 is not limited to the shape described in the above embodiment. That is, the circuit board 45 may not have the rectangular plate shape as long as the circuit board 45 includes two first edge portions parallel to each other and two second edge portions extending in a direction orthogonal to the first edge portions and the first edge portions are longer than the second edge portions.

A female connector may be provided in the extension portion 67 of the electric motor 60, and a male connector fitted into the female connector may be provided on the board case 40.

X1.

The invention claimed is:

1. An electric braking device comprising:
   an electric cylinder unit including
      an electric cylinder device that converts rotational motion of an electric motor into linear motion for driving a piston in a cylinder,
      a housing that supports the electric cylinder device,
      a circuit board that controls the electric motor, a power transmission terminal that is electrically connected to the circuit board, a power reception terminal that is electrically connected to the electric motor, and a connector that connects the power transmission terminal to the power reception terminal, the electric cylinder unit being configured to adjust a braking force applied to a vehicle by an operation of the electric cylinder device, wherein the electric cylinder device is supported by the housing so as to be removable from the housing by being moved relative to the housing in a removal direction when disassembling the electric cylinder unit, and the connector is disposed in a posture in which a fitting direction of the connector is directed to the removal direction.

2. The electric braking device according to claim 1, wherein the electric cylinder device is configured such that the electric motor is removable from the cylinder by moving the electric motor relative to the cylinder in the removal direction.

3. The electric braking device according to claim 2, wherein the removal direction is a direction along an axis of the cylinder, and the electric motor is attached to the cylinder in a posture in which an axis of the electric motor extends in the direction along the axis of the cylinder.

4. The electric braking device according to claim 1, wherein the circuit board is disposed in a posture in which a plate surface of the circuit board is parallel to an axis of the piston.

5. The electric braking device according to claim 1, wherein the electric motor includes a rotor, a stator, a motor housing that accommodates the rotor and the stator, and an extension portion extending radially outward from the motor housing, and the power reception terminal is provided on the extension portion.

6. The electric braking device according to claim 1, wherein the electric motor includes a rotor, a stator, and a motor angle sensor that detects a rotation angle of the rotor, and a detection signal from the motor angle sensor is input to the circuit board via the connector.

7. The electric braking device according to claim 2, wherein the circuit board is disposed in a posture in which a plate surface of the circuit board is parallel to an axis of the piston.

8. The electric braking device according to claim 3, wherein the circuit board is disposed in a posture in which a plate surface of the circuit board is parallel to an axis of the piston.

9. The electric braking device according to claim 2, wherein the electric motor includes a rotor, a stator, a motor housing that accommodates the rotor and the stator, and an extension portion extending radially outward from the motor housing, and the power reception terminal is provided on the extension portion.

10. The electric braking device according to claim 3, wherein the electric motor includes a rotor, a stator, a motor housing that accommodates the rotor and the stator, and an extension portion extending radially outward from the motor housing, and the power reception terminal is provided on the extension portion.

11. The electric braking device according to claim 4, wherein the electric motor includes a rotor, a stator, a motor housing that accommodates the rotor and the stator, and an extension portion extending radially outward from the motor housing, and the power reception terminal is provided on the extension portion.

12. The electric braking device according to claim 2, wherein the electric motor includes a rotor, a stator, and a motor angle sensor that detects a rotation angle of the rotor, and a detection signal from the motor angle sensor is input to the circuit board via the connector.

13. The electric braking device according to claim 3, wherein the electric motor includes a rotor, a stator, and a motor angle sensor that detects a rotation angle of the rotor, and a detection signal from the motor angle sensor is input to the circuit board via the connector.

14. The electric braking device according to claim 4, wherein the electric motor includes a rotor, a stator, and a motor angle sensor that detects a rotation angle of the rotor, and a detection signal from the motor angle sensor is input to the circuit board via the connector.

15. The electric braking device according to claim 5, wherein the electric motor includes a rotor, a stator, and a motor angle sensor that detects a rotation angle of the rotor, and a detection signal from the motor angle sensor is input to the circuit board via the connector.

* * * * *